Patented Oct. 14, 1924.

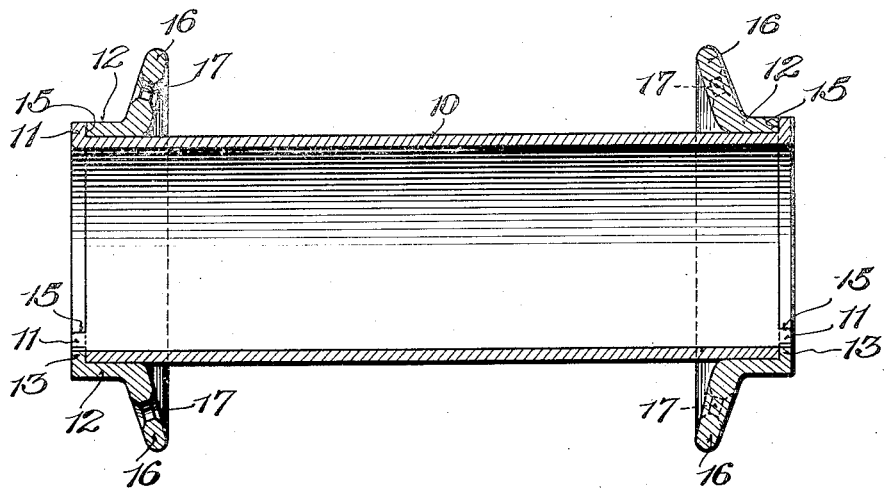
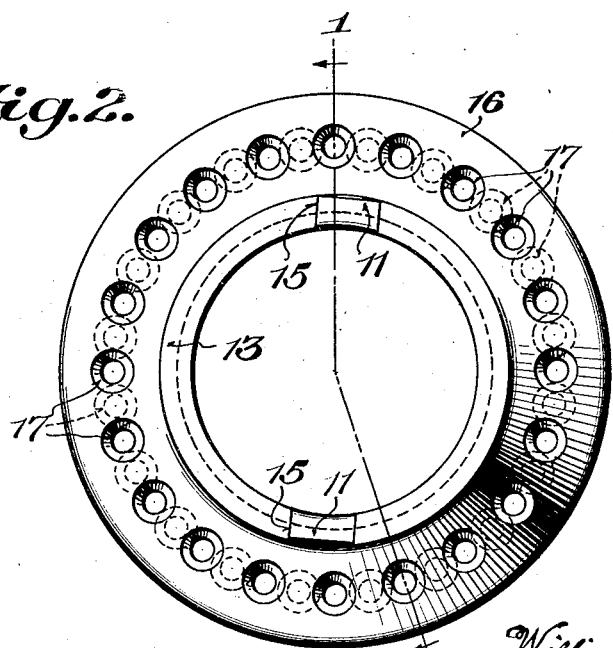

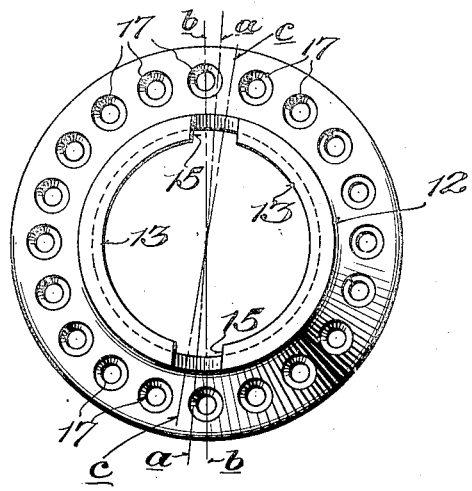
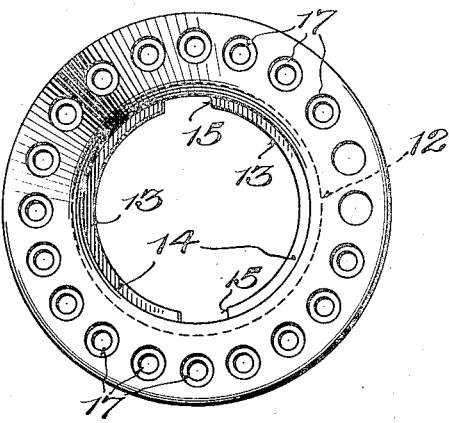
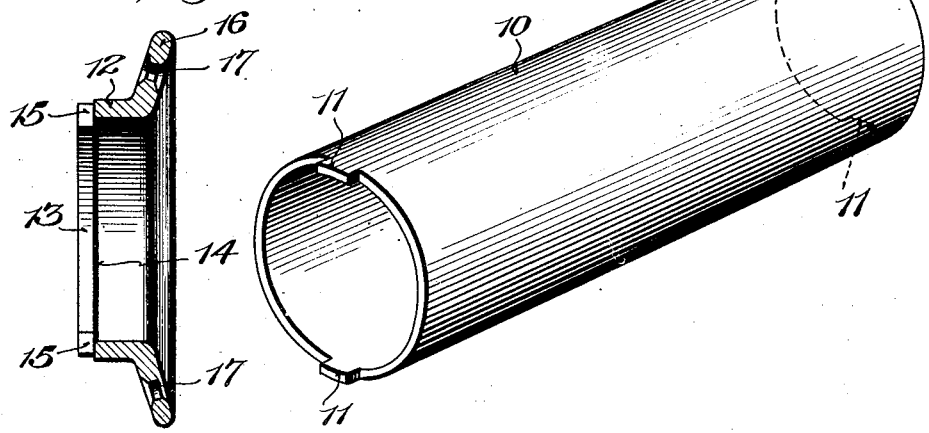

1,511,291

UNITED STATES PATENT OFFICE.

WILLIAM L. McGRATH, OF ELMIRA, NEW YORK.

WHEEL HUB.

Application filed January 3, 1919. Serial No. 269,451.

*To all whom it may concern:*

Be it known that I, WILLIAM L. Mc-GRATH, a citizen of the United States, and resident of Elmira, Chemung County, State of New York, have invented certain new and useful Improvements in Wheel Hubs, of which the following is a specification.

The present invention relates to wheel hubs and more particularly to hubs for the wheels of air craft landing gear. Such wheels do not transmit any torque but are subjected to the severe shocks and relatively heavy loads and the materials employed and structure of the hub must provide sufficient strength to withstand these conditions. It is the principal object of the invention to provide a hub which will stand up under the shocks and loads mentioned above and, at the same time, is of such a construction that it may be manufactured for less than hubs heretofore employed. The type of wheel mentioned preferably employs wire spokes and it is desirable to have the holes in the spoke flange at one end of the hub staggered relative to the holes in the spoke flange at the other end of the hub. According to the present invention the hub comprises a tube and two duplicate sleeves, one at each end of the hub and each having a spoke flange, and means for securing the sleeves on the tube which automatically positions them so that the spoke holes in one flange are staggered with respect to those in the other.

Other objects and features of novelty of the invention will be apparent from the description taken in connection with the drawings, in which:—

Figure 1 is a longitudinal sectional elevation through a hub constructed in accordance with the present invention, the section being taken substantially on the line 1—1 of Figure 2;

Figure 2 is an end elevation of the hub shown in Figure 1 as seen from the left of said figure;

Figure 3 is a longitudinal sectional elevation through one of the sleeves mounted at the end of the hub;

Figure 4 is an end view of said sleeve as seen from the left of Figure 3;

Figure 5 is a similar elevation as seen from the right of Figure 3; and

Figure 6 is a perspective view of the tube member of the hub.

Referring to the drawings the numeral 10 indicates the tube member of the hub which at each of its opposite ends is provided with a pair of axially extending tongues or lugs 11. The lugs at one end of the tube are similarly positioned with respect to those at the other end, and are diametrically opposite each other. A sleeve 12 is fitted on the peripheral surface of the tube at each end thereof. As clearly shown in Figures 3 to 5 inclusive these sleeves at one end have the inwardly extending flange 13 which forms a shoulder 14 against which the end of the tube abuts. The flange 13 at diametrically opposite points is cut away to form notches 15 which receive the tongues 11 on the tube. Preferably, the shoulder 14 and flange 13 are formed by machining out the bore of the sleeve to a greater diameter than at the flange portion, and the notches 15 are milled out. These notches 15 in addition to extending through the flange also extend radially outward through the sleeve so that the tongues 11 may be bent up at right angles and seated therein. The opposite end of each sleeve has the outwardly projecting spoke flange 16 which is preferably of conical form and provided with a circular series of uniformly spaced spoke receiving apertures 17. Referring to Figure 4 it will be observed that the radial line $a$ passing through the center of the notches 15 forms an angle with the radial line $b$ passing through the center of the nearest spoke aperture 17. Preferably, the center line $a$ intersects the arc $c$ connecting the centers of the two apertures 17 lying on opposite sides thereof at a point one-quarter of the length of the arc $c$ from its end. Because of this arrangement of the apertures with respect to the notches, and further because the sleeves 12 are reversed with respect to each other when assembled on the hub, the apertures 17 in one flange will be staggered with respect to those in the other. While the angle between lines $a$ and $b$ preferably is one-quarter of the angle subtended by the arc connecting the centers of adjacent holes, the invention is not limited to this angle as the only requirement is that said angle shall be less than one half the angle subtended by said arc. This staggered relation is very desirable as it permits the spokes to be laced more easily and further provides a better distribution for the strains coming on the wheel.

Heretofore, the hubs for wheels of the type mentioned herein have been made of three parts, the spoke flanges being secured to the tube by soldering, brazing, welding or pinning in place. The defects of such constructions are; a heating operation detrimental to the primary heat treatment of the material entering into the hub; the practical impossibility of properly locating the spoke flanges with reference to each other when the spoke holes are drilled before assembly; or the distortion of metal at some points subject to initial or ultimate shock. According to this invention these defects are overcome and a hub is provided having a maximum strength for its weight.

Although an embodiment of the invention has been described in detail, it is not thus limited but includes changes and modifications which come within the scope of the appended claims.

Having thus described the invention what is claimed as new and desired to be secured by Letters Patent is:—

1. A hub for wire wheels comprising in combination, a tube, a pair of like ring members, one on each end of the tube reversed end for end relative to each other, each member including a spoke flange formed with a series of equally spaced spoke holes, and means for positioning said rings on the tube with the holes in one flange staggered relative to the holes in the other including one member of an interlock at each end of the tube, cooperating interlocks on each ring, one of said interlock members being positioned so that the angle formed by the radial plane through the center line of said interlock member and the radial plane through the center of a hole in one of said rings is less than about one-half of the angle subtended by a pair of holes in the rings.

2. As an article of manufacture, a spoke ring comprising a sleeve having an inwardly extending flange forming a shoulder, said flange formed with a notch, and an outwardly extending spoke flange formed with a circular series of equally spaced spoke holes located so that the radial line through the center of the width of the notch intersects the line connecting the centers of a pair of adjacent holes at a point substantially one quarter of the length thereof.

3. The method of making a hub for a wire wheel which includes forming a pair of like ring members each provided with a spoke flange and a hub flange, forming one element of an interlock in each hub flange, forming a plurality of equally spaced spoke holes in each spoke flange in such relation to said interlocking elements that the distance of the nearest hole to the radial axis of said element is substantially a quadrisection of the distance between successive holes, forming a hub body with the mating elements of said interlock on its opposite ends, positioning said ring members in reverse relation on the opposite ends of said body, and interlocking said ring members to said hub.

In testimony whereof I affix my signature.

WILLIAM L. McGRATH.